June 26, 1923.

R. KECK

AXLE CONSTRUCTION

Filed July 23, 1918

1,460,064

INVENTOR
Robert Keck

By Fay, Oberlin & Fay.
ATTORNEYS.

Patented June 26, 1923.

1,460,064

UNITED STATES PATENT OFFICE.

ROBERT KECK, OF CHICAGO, ILLINOIS, ASSIGNOR TO THE DOUBLE DRIVE TRUCK COMPANY, OF CHICAGO, ILLINOIS, A CORPORATION OF SOUTH DAKOTA.

AXLE CONSTRUCTION.

Application filed July 23, 1918. Serial No. 246,285.

*To all whom it may concern:*

Be it known that I, ROBERT KECK, a citizen of the United States, and a resident of Chicago, county of Cook, and State of Illinois, have invented a new and useful Improvement in Axle Construction, of which the following is a specification, the principle of the invention being herein explained and the best mode in which I have contemplated applying that principle, so as to distinguish it from other inventions.

The present invention, relating as indicated to axle construction, is more particularly directed to the provision of an improved means of housing a worm driven axle within which a differential mechanism is driven by means of a worm formed on the driving or propeller shaft of a vehicle. Another object of the invention is the provision of a housing of this type which will allow of convenient and quick removal of the worm from the differential to allow for inspection, replacement or repair of any of these parts. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Figure 1:
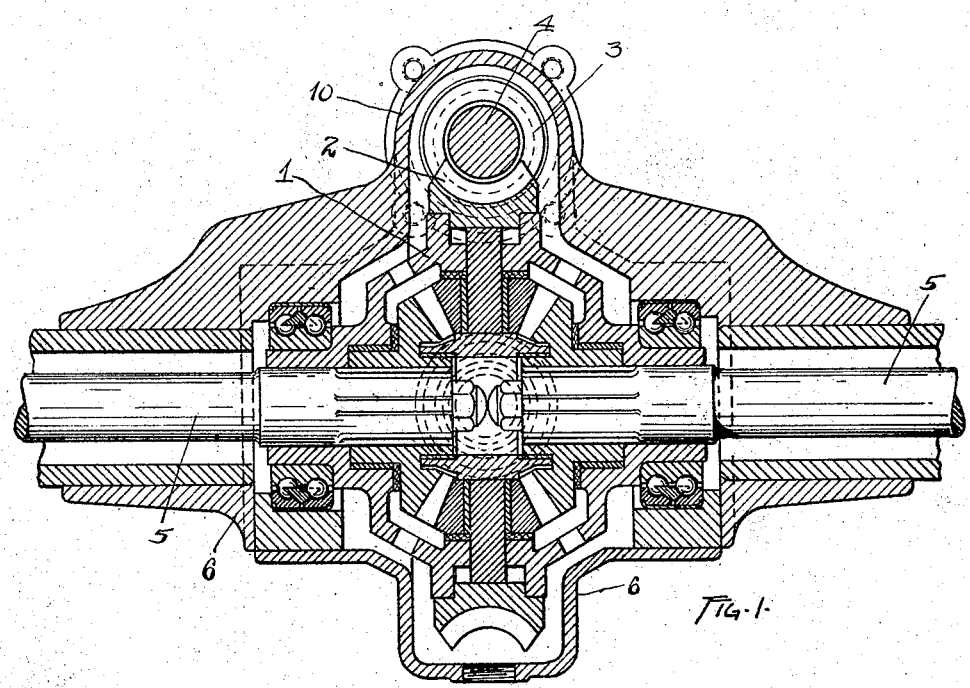
Figure 2:
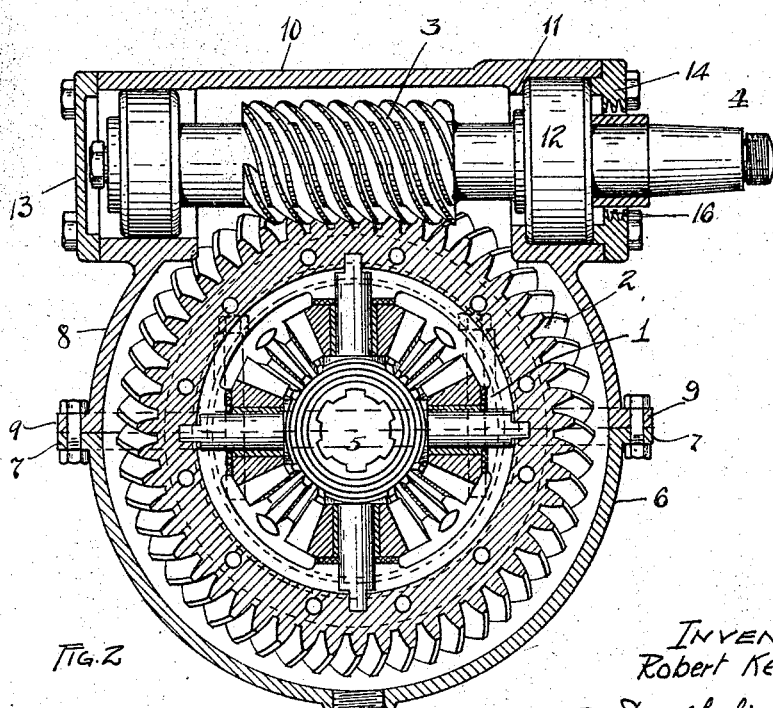

Fig. 1 is a transverse vertical section on a plane in front of the axle; and Fig. 2 is a central transverse vertical section, partially in elevation.

In each of the figures there is shown a differential mechanism 1 driven by means of a worm gear 2 from a worm 3 on a worm shaft 4, which represents the driving or propeller shaft of a vehicle. It is not necessary to describe at length either the construction of the differential mechanism or its operation, as this is of course well known, and will be readily apparent from the two views shown.

The differential mechanism 1, and the axle shafts 5 thereof, are suitably carried and enclosed in an axle casing or housing 6, the central portion of which, extending about the differential mechanism, terminates at the horizontal central plane of the differential mechanism, where it is provided with laterally extending flanges 7. Removably mounted upon this lower portion 6, and directly upon the flange 7, is an upper portion 8 of the enclosing casing which is provided with a flange 9 registering with flange 7 and bolted thereto. The lower part of the upper casing 8 is circular and conforms, as will be seen, to the circular form of the lower portion 6, but is provided with a tubular extension 10 at its top, which extension extends transversely of the axle and is provided with an internally extending circular flange 11, against which are received and carried bearings 12 for the worm shaft 4. This tubular extension 10 is open at either end, these openings being normally closed by means of cover plates 13 and 14 which are removably bolted to the extension, and the plate 14 is provided with oil retaining grooves 16 to prevent the leakage of lubricant from the interior of the casing and the extension.

In assembling the casing and axle the differential mechanism and the axles are first assembled in the casing, and the worm, worm shaft and bearings are separately assembled in the upper portion 8 of the casing, together with the cover plates for the open ends of the tubular extension. The upper portion of the casing, together with the worm shaft, is then assembled on the lower portion of the casing, and of course can be as readily dis-assembled by the removal of the lower from the upper part of the casing when it is desired to inspect the various parts, or repair them, or refill the casing with lubricant. By the removal of the cover plates 13 and 14 inspection may be made of the bearings 12.

I am aware that bevel driven axles have heretofore been used in which the bevel driving pinion on the propeller shaft is formed as a part of the removable front cover plate of the differential enclosing housing, but this construction is entirely different from the one here proposed, and is not capable of adaptation to worm driven axles.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a worm driven axle the combination of a differential enclosing casing consisting of an upper and a lower section, said upper section having formed integrally with the upper wall thereof an open-ended transversely extending tubular housing provided with an integral internal flange spaced from its forward end to provide an abutment for the forward bearing of a worm shaft, flanges upon the abutting edges of said upper and lower sections, fastening elements associated with said flanges and serving as the sole means of securing the lower section to said upper section, a differential mechanism maintained in assembled position by said lower section, a worm shaft mounted within said housing on said upper section and provided with forward and rearward bearings, an annular cover plate removably connected with the forward end of said housing for positioning said forward bearing against said internal flange and a disclike cover plate removably connected with the rearward portion of said tubular housing to provide for access to said rearward bearing.

Signed by me, this 17 day of July, 1918.

ROBERT KECK.